(No Model.) 2 Sheets—Sheet 2.

I. S. HARTSOCK.
KITCHEN CABINET.

No. 489,951. Patented Jan. 17, 1893.

Witnesses
J. Ulke Jr.
H. F. Riley

Inventor
I. S. Hartsock
By his Attorneys,
C. A. Snow & Co.

UNITED STATES PATENT OFFICE.

ITHAMAR S. HARTSOCK, OF VAN WERT, OHIO.

KITCHEN-CABINET.

SPECIFICATION forming part of Letters Patent No. 489,951, dated January 17, 1893.

Application filed January 23, 1892. Serial No. 419,056. (No model.)

*To all whom it may concern:*

Be it known that I, ITHAMAR S. HARTSOCK, a citizen of the United States, residing at Van Wert, in the county of Van Wert and State of Ohio, have invented a new and useful Kitchen-Cabinet, of which the following is a specification.

The invention relates to improvements in kitchen cabinets.

The object of the present invention is to provide a combined kitchen cabinet and flour receptacle in which the flour and the utensils for kneading the same will be conveniently arranged, both as to economy and cleanliness, and in which bread may be kept without losing its moisture and in which dough may be kept warm.

The invention consists in the construction and novel combination and arrangement of parts hereinafter fully described, illustrated in the accompanying drawings and pointed out in the claims hereto appended.

Figure 1:
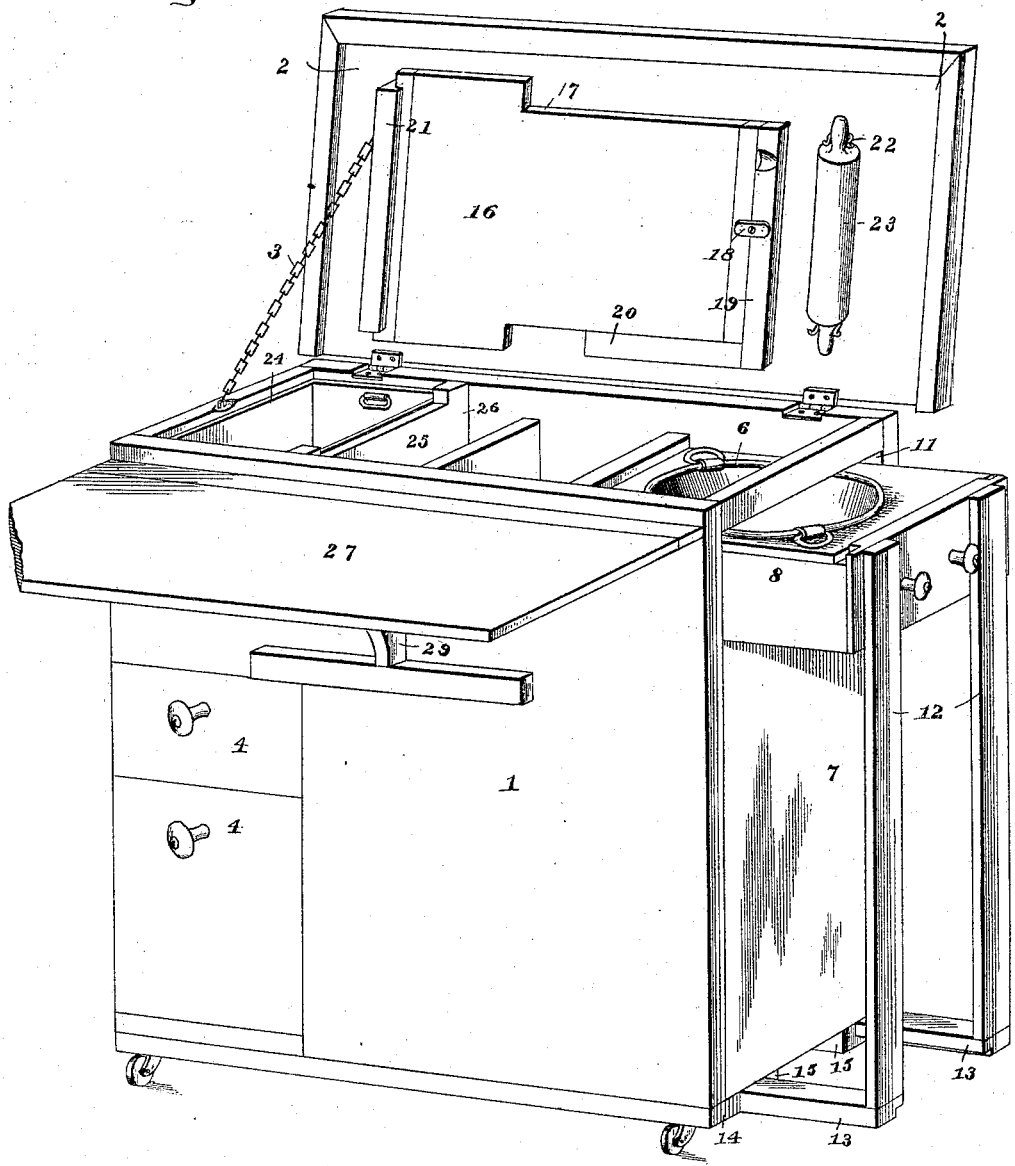
Figure 2:
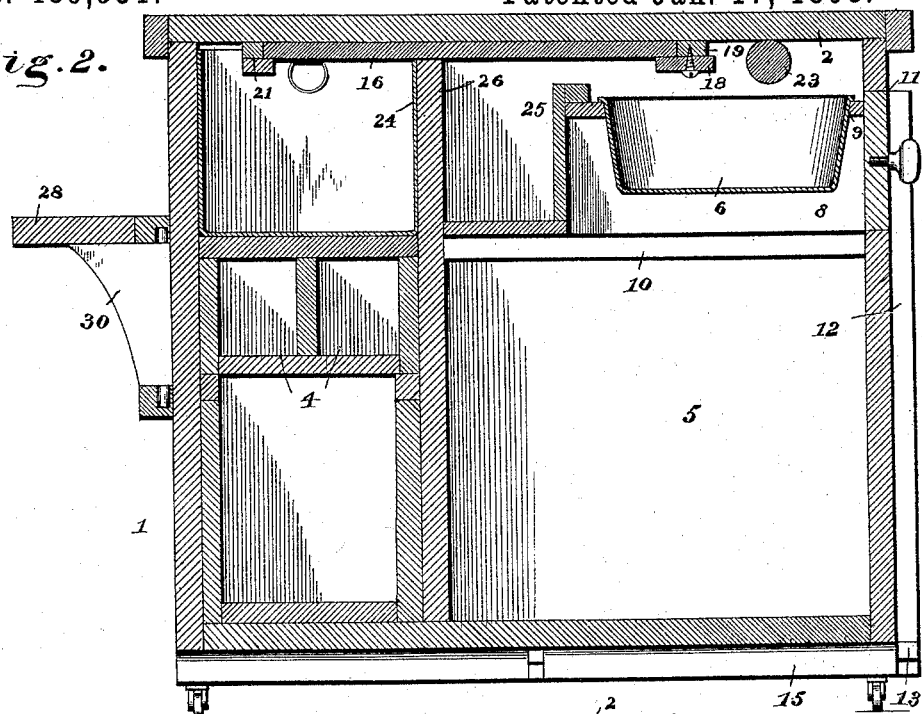
Figure 3:
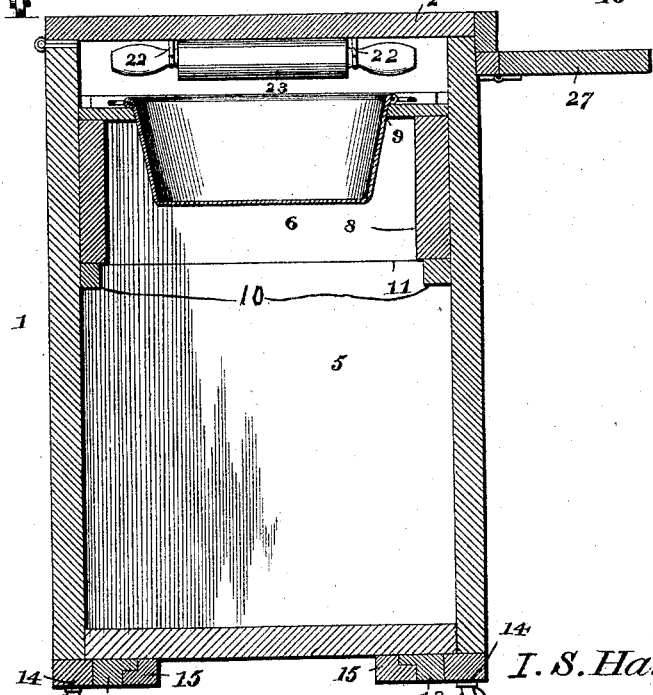

In the drawings:—Figure 1 is a perspective view, the cover of the cabinet being raised and the sliding frame being drawn out. Fig. 2 is a longitudinal sectional view. Fig. 3 is a transverse sectional view.

Like numerals of reference indicate corresponding parts in all the figures of the drawings.

1 designates a cabinet or frame which is rectangular in cross-section, and which is provided with a hinged cover 2 adapted to be swung back and be supported in a slightly inclined position by a chain 3 arranged at one end of the cabinet and attached to the same and the cover.

The cabinet is provided at one end with a nest of drawers 4 and between the same at the other end of the cabinet is a flour receptacle or compartment 5 over which is arranged a kneading pan or tray 6, which is supported by a sliding frame 7 adapted to be withdrawn to expose the flour compartment and to permit flour to be obtained.

The top 8 of the sliding frame 7 is provided with a circular pan opening 9, and it is supported on cleats 10, which form tracks or ways and the adjacent end of the cabinet is provided with a rectangular opening 11 to permit the withdrawal and insertion of the sliding frame. The outer side of the top of the sliding frame is provided with knobs and is secured to the upper ends of uprights 12, the lower ends of which are attached to L-shaped slides 13, arranged between cleats or guides 14, and 15. The cleats 15 are rabbeted to receive the flanges of the slides.

The uprights support the upper portion of the sliding frame when the kneading pan is drawn out for the purpose of sifting flour for the mixing process and when the dough is mixed and is ready to let stand, the sliding frame can be run into the cabinet, and the lid or cover of the same is shut down, keeping the dough from the action of the air and also keeping it warm until it is ready to be worked into loaves for baking. When the dough is ready for working, the sliding frame is withdrawn from the cabinet and a kneading board 16 is placed over the body of the cabinet. The kneading board has its sides 17 recessed the greater portion of their length to make a portion of the kneading board slightly narrower than the cabinet, in case while kneading there should be superfluous flour it may be readily emptied from the kneading board into the cabinet. The narrow portion of the kneading board formed by the recesses fits in a recess in a wall or partition 26 of a compartment 25 when the cover 2 is closed.

When the kneading board is not in use, it is secured to the inner face of the cover 2 by a pivoted button 18 and it is supported by cleats 19 and 20 arranged at right angle to each other and extending along one end and a portion of one side of the kneading board and by a flanged cleat 21 extending along the opposite end of the kneading board and having its flange projecting over the adjacent end of the kneading board, whereby that end is secured to the cover. The other end is secured by the pivoted button 18 which is arranged on the cleat 19.

On the inner face of the cover adjacent to the cleat 19 are spring catches 22 provided with arms adapted to engage the handles of a rolling pin 23, which is held in convenient position for use.

In the space above the nest of drawers 4 is arranged a bread pan 24 which may be readily removed for cleaning and which is adapted to hold bread and prevent the escape of moisture therefrom. Adjacent to the inner side of the bread pan is a compartment 25 which extends over the flour receptacle or bin and is adapted to contain a bread knife, a stirring spoon and other articles and the wall 26 of the box or compartment 25 supports the inner end of the kneading board when the latter is in use, the outer end of the same being supported by the top of the sliding frame.

At the front and one side or end of the cabinet are shelves 27 and 28 which are hinged to the cabinet and when in a horizontal position are supported by pivoted brackets 29 and 30. The shelf at the front is adapted to form an extension of the cabinet and enables the kitchen cabinet to be used as a table. The shelf at the end of the cabinet is adapted more especially for holding water or other articles used in mixing dough for baking. The larger drawer is designed for holding bread pans, pie pans, and the like, and the upper smaller drawer is constructed especially for holding spices and the like.

Having thus described my invention what I claim is;—

1. In a kitchen cabinet, the combination of a casing provided at one end near the top with a horizontal opening, the horizontal supporting cleats secured to the inner faces of the front and back of the casing and extending inward from said opening, the guides 14 and 15 arranged longitudinally of the bottom of the casing at the front and back thereof, the guides 15 being provided with flanges, and a pan supporting frame having a horizontal upper portion arranged on said supporting cleats and sliding through the opening of the casing and provided at its inner end at the upper edge thereof with a transversely disposed stop cleat arranged to engage the casing above the opening to prevent the upper portion of the pan supporting frame being entirely withdrawn, said upper portion being provided with a pan opening, the slides 13 arranged between said guides and provided with flanges engaging those of the guides 15, and the parallel uprights 12 having their upper ends secured to the outer end of the upper portion of the frame and having their lower ends supported upon the outer ends of the slides and connecting the upper portion and the slides, substantially as described.

2. In a kitchen cabinet, the combination of a casing having a partition 26 provided in its upper edge with a kneading-board-receiving recess, a cover for the cabinet, a kneading board provided at opposite sides with recesses and adapted to be supported by said partition 26 to provide open spaces at each side of the board to permit superfluous flour thereon to be returned to the cabinet, and cleats secured to the inner face of the cover and conforming to the configuration of the kneading board and adapted to hold the same, substantially as and for the purpose described.

In testimony that I claim the foregoing as my own I have hereto affixed my signature in the presence of two witnesses.

ITHAMAR S. HARTSOCK.

Witnesses:
C. F. MANSHIP,
F. A. CRAMER.